(No Model.)

A. B. CLARK.
NUT LOCK.

No. 305,793.   Patented Sept. 30, 1884.

Witnesses.
A. Ruppert.
J. W. Carner

Inventor.
Alvin B. Clark,
by England and Blanchard,
Attys

UNITED STATES PATENT OFFICE.

ALVIN B. CLARK, OF RICHMOND, INDIANA, ASSIGNOR OF ONE-HALF TO CHARLES W. ELMER, OF SAME PLACE.

NUT-LOCK.

SPECIFICATION forming part of Letters Patent No. 305,793, dated September 30, 1884.

Application filed March 10, 1884. (No model.)

*To all whom it may concern:*

Be it known that I, ALVIN B. CLARK, a citizen of the United States, residing at Richmond, in the county of Wayne and State of Indiana, have invented certain new and useful Improvements in Nut-Locks, of which the following is a specification, reference being had therein to the accompanying drawings.

My invention relates to an improvement in nut-locks; and it consists in the peculiar construction of a spring that is adapted to prevent the nuts from turning upon the bolts and thus working loose, as will be more fully set forth hereinafter.

Figure 1:
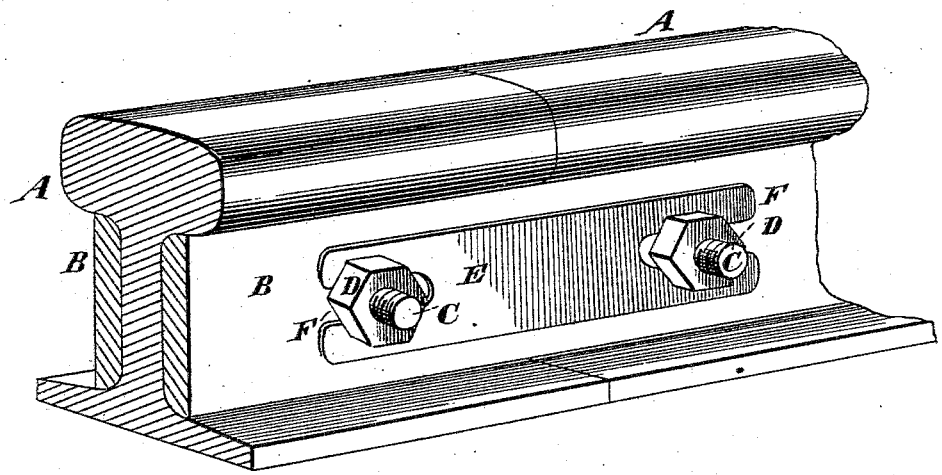
Figure 2:
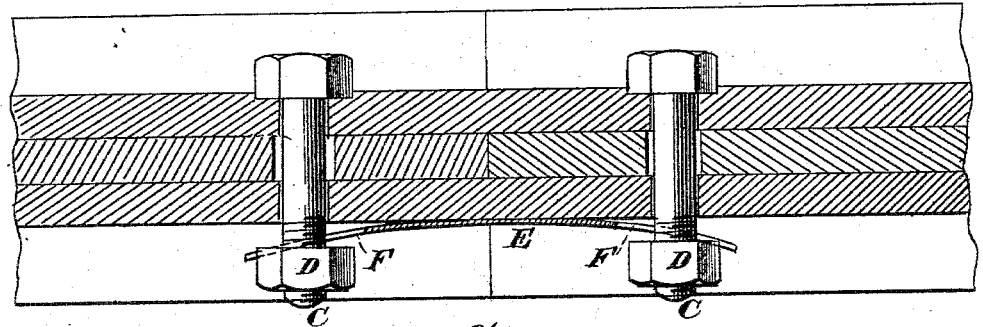

In the accompanying drawings, Figure 1 is a perspective of a railroad-rail joint with my invention applied thereto. Fig. 2 is a horizontal longitudinal central section of the same, and Fig. 3 is a detailed perspective of the spring.

A A represent railroad-rails of the ordinary construction, and B represents fish-plates that are applied thereto at the joints in the ordinary manner. Through these rails and fish-plates extend the bolts C, to the outer screw-threaded ends of which are applied the nuts D. These bolts and nuts serve to secure the fish-plates to the rails, as shown.

Figure 3:
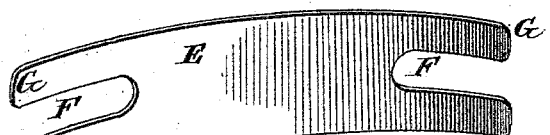

E represents a flat spring that is preferably made of steel, and is bent so as to assume a slightly curved shape normally, as shown at Fig. 3. This spring is slightly longer than the space between the outer edges of the nuts, and in the extremities of this spring are cut the open-ended slots F, which slots are a little longer than the greatest width of the polygonal nuts D. In practice I apply the spring to the outer side of the inner fish-plates, so that the bolts C extend through the slots F. The nuts are then screwed down, as indicated at Fig. 2. Owing to the curved shape of the spring, its projecting ends G extend outwardly on each side of one of the angular corners of the nuts, and thus effectually prevent them from turning back upon the threaded ends of the bolts and working loose.

When it is desired to remove the nuts from the bolts, it is only necessary to press the ends of the spring inwardly against the fish-plate, when the ends G will release their hold upon the nuts.

By reason of the oblong slots in the nut-lock, it adapts itself to the nuts whether they are the exact distance apart in every case or not, which is a great advantage in many instances, as the apertures for the bolts in every case are seldom bored at a uniform distance apart.

A nut-lock thus constructed is exceedingly effective, simple, and inexpensive, and can be applied to or detached from a rail-joint in a very short time.

I am aware that notched and slotted springs have heretofore been employed as nut-locks; but in all cases, to my knowledge, the slots or notches are so formed as to require the bolts to be exactly the same distance apart in every case, which it is the object of my invention to obviate.

Having thus described my invention, I claim—

1. A nut-lock consisting of a curved spring having open oblong slots at each end, the sides of which are adapted to engage the corners of the nuts when in place, substantially as specified.

2. The combination, with the bolts passing through the parts to be secured and the nuts, of the nut-lock consisting of a curved spring having open-ended oblong slots at each end, substantially as specified.

In testimony whereof I affix my signature in presence of two witnesses.

ALVIN B. CLARK.

Witnesses:
 JOS. LONG,
 J. M. WASSON.